United States Patent
Nagata

(10) Patent No.: US 7,327,235 B2
(45) Date of Patent: Feb. 5, 2008

(54) ALARM SOUND OUTPUTTING DEVICE FOR VEHICLE AND PROGRAM THEREOF

(75) Inventor: Takashi Nagata, Nagoya (JP)

(73) Assignee: DENSO CORPORATION, Kariya (JP)

( * ) Notice: Subject to any disclaimer, the term of this patent is extended or adjusted under 35 U.S.C. 154(b) by 233 days.

(21) Appl. No.: 11/146,109

(22) Filed: Jun. 7, 2005

(65) Prior Publication Data
US 2005/0280519 A1 Dec. 22, 2005

(30) Foreign Application Priority Data
Jun. 21, 2004 (JP) .............................. 2004-182749

(51) Int. Cl.
*B60Q 1/00* (2006.01)
*G08B 3/00* (2006.01)
*H04R 5/02* (2006.01)

(52) U.S. Cl. .................. 340/435; 340/425.5; 340/460; 340/692; 340/384.1; 381/302; 381/307; 381/310; 381/86

(58) Field of Classification Search ................. 340/435
See application file for complete search history.

(56) References Cited

U.S. PATENT DOCUMENTS 5,450,057 A  9/1995  Watanabe

2002/0039070 A1* 4/2002 Ververs et al. .............. 340/901
2003/0141967 A1* 7/2003 Aichi et al. ................. 340/435
2004/0091123 A1* 5/2004 Stark et al. .................... 381/86
2005/0270146 A1* 12/2005 Enya et al. ................. 340/438

FOREIGN PATENT DOCUMENTS

JP  A-2004-251769  9/2004

* cited by examiner

Primary Examiner—Donnie L. Crosland
(74) Attorney, Agent, or Firm—Posz Law Group, PLC

(57) ABSTRACT

In a vehicle alarm sound outputting device, in a filter coefficient generator, interpolation of filter coefficients is carried out in accordance with the relative position between a vehicle and an object by using head related transfer functions serving as base data in a filter coefficient interpolator. Particularly when the object moves, the relative position of the object is sequentially grasped while following the movement of the object, and the interpolation of the filter coefficients is carried out. In a filter coefficient synthesizer, the interpolated head related transfer functions and the cross-talk removing filter coefficients are combined with one another to generate virtual sound source filter coefficients. The virtual sound source filter coefficients generated in the filter coefficient generator are convoluted with the audio data of an alarm sound, and audio signals of the virtual sound source are generated in connection with the right and left speakers. Accordingly, a driver can hear an alarm sound from the position at which the object exists (in accordance with movement of the object).

16 Claims, 9 Drawing Sheets

- POSITION OF VIRTUAL SOUND SOURCE FOLLOWING MOVEMENT OF OBJECT

POSITION OF VIRTUAL SOUND SOURCE
- MOVE FROM NEAR POSITION TO FAR POSITION (OBJECT)

POSITION OF VIRTUAL SOUND SOURCE
- RECIPROCATE AROUND OBJECT

ALARM SOUND OUTPUTTING DEVICE FOR VEHICLE AND PROGRAM THEREOF

CROSS REFERENCE TO RELATED APPLICATION

This application is based upon, claims the benefit of priority of, and incorporates by reference the contents of, Japanese Patent Application No. 2004-182749 filed on Jun. 21, 2004.

FIELD OF THE INVENTION

The present invention relates to a vehicle alarm sound outputting device for generating an alarm sound to warn passengers of existence of an obstacle or the like in a vehicle room, and a program therefore.

BACKGROUND OF THE INVENTION

A device for displaying an abnormal place by turning on an indicator or outputting an electronic sound interlockingly with an indicator in order to warn passengers of occurrence of abnormality such as incomplete door closing or the like is known.

This technique enables passengers of a vehicle to recognize occurrence of abnormality. However, it has a problem that with only an alarm sound the passengers cannot identify a door falling in the incomplete door close state. Furthermore, a warning device for collision avoidance has a problem that with only an alarm sound, passengers cannot immediately specify a site of a vehicle to which another vehicle approaches.

As a countermeasure to the above problem, the applicant of this application has already proposed the technique that virtual sound sources are disposed at warning sites so that passengers can instantaneously identify any abnormal site (warning site) to be warned and hear alarm sounds from the virtual sound sources (JP-A-2003-220911 (page 1, FIG. 14) or US counterpart application US2003/0141967A1).

However, in the above technique, the passengers merely hear alarm sounds from predetermined virtual sound sources, and thus a countermeasure to further enhance the warning effect has been required.

Patent related publications JP-A-2004-251769 and JP-A-5-126948 (U.S. Pat. No. 5,450,057) also disclose techniques for enabling passengers of a vehicle to recognize occurrence of abnormality. However, these publications never disclose a method of generating a virtual sound source, and also leave the acoustic characteristic in the vehicle room out of consideration. Accordingly, it is estimated that it is difficult for these techniques to supply information to a listener from a desired position (make a listener hear a sound).

SUMMARY OF THE INVENTION

The present invention has been implemented in view of the foregoing situation, and has an object to provide a vehicle alarm sound outputting device that enables passengers to instantaneously and effectively know a site causing an alarm sound, and a program for the alarm sound outputting device.

A vehicle alarm sound outputting device for driving an alarm sound outputting unit (for example, a speaker) and outputting an alarm sound on the basis of information from a condition detecting unit (for example, a laser radar, a sonar, a camera or the like) for detecting the condition of a vehicle or the condition of the surrounding of the vehicle, comprises a position setting unit for setting a localization position of a virtual sound source of the alarm sound in accordance with a detection result of the condition detecting means, and a warning control unit for controlling the alarm sound outputting unit so that a passenger of a vehicle hears the alarm sound from the virtual sound source, wherein the sound localization position of the virtual sound source is controlled to be moved so that the passenger of the vehicle can hear the alarm sound as if the alarm sound moves.

The localization position of the virtual sound source is controlled to move so that a passenger can hear an alarm sound informing existence of an obstacle or the like as if the alarm sound moves in an attention-paying direction (or the vicinity thereof). Accordingly, the passenger can more instantaneously and specifically grasp a site or the like to be warned by the alarm sound as compared with a case where the passenger hears the alarm sound from a fixed position, and thus the warning effect can be extremely enhanced.

When a virtual sound source is moved, the virtual sound source can be set at a desired position by carrying out interpolation processing of a predetermined number of virtual sound sources.

As detection targets of the condition detecting unit may be considered an obstacle such as another vehicle (front vehicle or the like) or the like, a target in guidance based on a navigation device, states of the vehicle concerned such as an incompletely closed door, air pressure of tires, etc., breakdown of light, etc. Furthermore, as alarm sounds may be considered not only sounds such as an electronic sound, a buzzer sound, etc., but also voices.

When an object around the vehicle concerned is detected by the condition detecting unit, the localization position of the virtual sound source is moved while following the moving direction of the object.

When an obstacle (object) such as another vehicle or the like around the vehicle concerned is detected by a laser radar or the like, the localization position of the virtual sound source is moved while following the moving direction of the other vehicle as shown in FIG. 2A. Accordingly, the passenger hears the alarm sound along the moving direction of the object, and thus the passenger can instantaneously and clearly recognize the site to be alarmed.

The localization position of the virtual sound source is moved along an attention-paying direction from the passenger to the virtual sound source.

In such a case that an incompletely closed door is detected, the localization position of the virtual sound source is moved from the passenger along the attention-paying direction corresponding to the direction of the incompletely closed door as shown. Accordingly, the passenger hears the alarm sound along the attention-paying direction, and thus it is possible for the passenger to instantaneously and clearly recognize the site to be alarmed.

The localization position of the virtual sound source is moved so as to be far away from the passenger.

Accordingly, the passenger hears the alarm sound as if the alarm sound is far away from the passenger in the attention-paying direction, whereby the passenger's attention is further attracted.

The localization position of the virtual sound source is moved so that the attention-paying direction from the passenger to the virtual sound source is varied within a predetermined range when viewed from the passenger.

For example when an incompletely closed door is detected, the localization position of the virtual sound source is moved so that the attention-paying direction is varied within a predetermined range. Accordingly, a direction along which the passenger hears the alarm sound is moved as if it is vibrated, and thus it is possible for the passenger to instantaneously and clearly recognize the site to be warned.

The localization position of the virtual sound source is moved so that the attention-paying direction reciprocates in a horizontal direction (parallel to the road), a vertical direction (vertical to the road) or an oblique direction (oblique instead of horizontal or vertical).

Accordingly, a method of moving the attention-paying direction is provided.

The virtual sound source may be based on a stereo dipole system as a method of generating the virtual sound source. Various methods which can implement the virtual sound source can be properly adopted in addition to the stereo dipole system.

The condition detecting unit may be a periphery monitoring unit for detecting an obstacle existing around the vehicle concerned. As the peripheral monitoring unit may be adopted various kinds of units such as a laser radar, a camera, a sonar, etc.

The condition detecting unit is a unit for detecting the condition of the vehicle interlockingly with a car navigation device.

That is, the position of the vehicle concerned, the position of the target, the positional relationship between the vehicle concerned and the target, etc. are known by using a car navigation device. Therefore, for example, on the basis of this information, the alarm sound can be controlled to be output with the direction to the target set as the attention-paying direction.

The condition detecting unit is a unit for achieving position information of an emergency vehicle out of the vehicle concerned.

When information on the position of an emergency vehicle or the like is achieved from a communication center or the like by using VICS or the like, an alarm sound can be controlled to be output with the direction of the emergency vehicle as an attention-paying direction.

A filter coefficient generating unit for generating virtual source filter coefficients in accordance with a localization position of the virtual sound source; a convolution calculator for conducting convolution calculation on audio data of the alarm sound and filter coefficients of the virtual sound source and outputting a virtual sound source audio signal; and a virtual sound source outputting unit for reproducing and outputting the virtual sound source audio signal from the alarm sound outputting unit.

This aspect provides the procedure of enabling a passenger to hear an alarm sound based on a virtual sound source. The virtual sound source filter coefficients are generated in accordance with the localization position of the virtual sound source in the filter coefficient generator, the audio data of the alarm sound and the virtual sound source filter coefficients are subjected to the convolution calculation to achieve a virtual sound source audio signal, and the virtual sound source audio signal is reproduced and output from the alarm sound outputting unit in the virtual sound source output unit, whereby the passenger can hear the alarm sound from the localization position.

The filter coefficient generator carries out interpolation on prescribed virtual sound source filter coefficients to achieve a virtual sound source filter coefficient corresponding to a localization position of a target virtual sound source.

For example, it is not realistic that the head related transfer functions are stored so that the whole space around the passenger can be set as the localization position of the virtual sound source. Therefore, head related transfer functions corresponding to a predetermined number of localization positions are stored, and the interpolation is carried out on these localization positions to achieve head related transfer functions of desired localization positions. Through this interpolation processing, loads of storage of data and calculation processing can be reduced.

The filter coefficient generator combines head related transfer functions and cross-talk removing filter coefficients to achieve the virtual sound source filter coefficients.

The head related transfer functions are coefficients for determining the localization position of the virtual sound source, and the cross-talk removing filter coefficients are coefficients for canceling sounds entering the other ear so that a sound output from one speaker can be heard by only one ear, in order to implement the virtual sound source by a speaker. Accordingly, by combining the head related transfer functions and the cross-talk removing filter coefficients, a passenger can hear an alarm sound from at least one speaker as if the alarm sound sounds from the localization position of the virtual sound source.

The filter coefficient generator carries out interpolation on cross-talk removing filter coefficients to achieve the virtual sound source filter coefficients.

For example, the transfer characteristic of sounds is varied in accordance with the open/close state of a window or the vehicle state such as the number of passengers of the vehicle or the arrangement of the passengers. Accordingly, the interpolation of the cross-talk removing filter coefficients is carried out in accordance with the vehicle state to achieve virtual sound source filter coefficients, whereby an alarm sound is effectively heard from the localization position of the desired virtual sound source.

Further, a program for making a computer implementing the function of the vehicle alarm sound outputting device according to any one of the above aspects is provided.

That is, the function of the vehicle alarm sound outputting device can be implemented by the processing carried out by a computer program.

In the case of the program as described above, the program may be stored in a computer-readable recording medium such as FD, MO, DVD-ROM, CD-ROM, hard disk or the like, and the program is loaded into a computer as occasion demands. Alternatively, this program may be recorded by using ROM or backup RAM as a computer-readable recording medium to record this program, and ROM or backup RAM may be installed into the computer.

Accordingly, operation of the vehicle alarm sound outputting device can be adapted to the acoustic characteristic inherent to the vehicle room which is varied according to the open/close state of windows and the arrangement of passengers.

Furthermore, even when the relative position between the driver and the object being detected is not varied, intentional movement of the localization position of the virtual sound source attracts driver's attention and makes the driver easily perceive the object.

Still furthermore, driver's attention can be attracted, not to one point, but to a fixed range. At this time, if the moving range of the localization position is set to be coincident with the size of the object, the driver can immediately perceive not only the position of the object, but also the size thereof. (note)

Furthermore, it is estimated that some displacement occurs between a desired localization position and an actual localization position due to the difference in acoustic characteristic among individuals or an environmental variation in the vehicle room. Therefore, if the driver's attention is attracted to one point, it would be considered such a situation that no object exists at that position and it is delayed to (visually) perceive the object.

Therefore, an object to which attention is made to be attracted is absolutely contained in the moving range of the virtual sound source by moving the virtual sound source in a fixed range, and thus the driver can quickly perceive the object.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Preferred embodiments according to the present invention will be described hereunder with reference to the accompanying drawings.

First Embodiment

Figure 1:
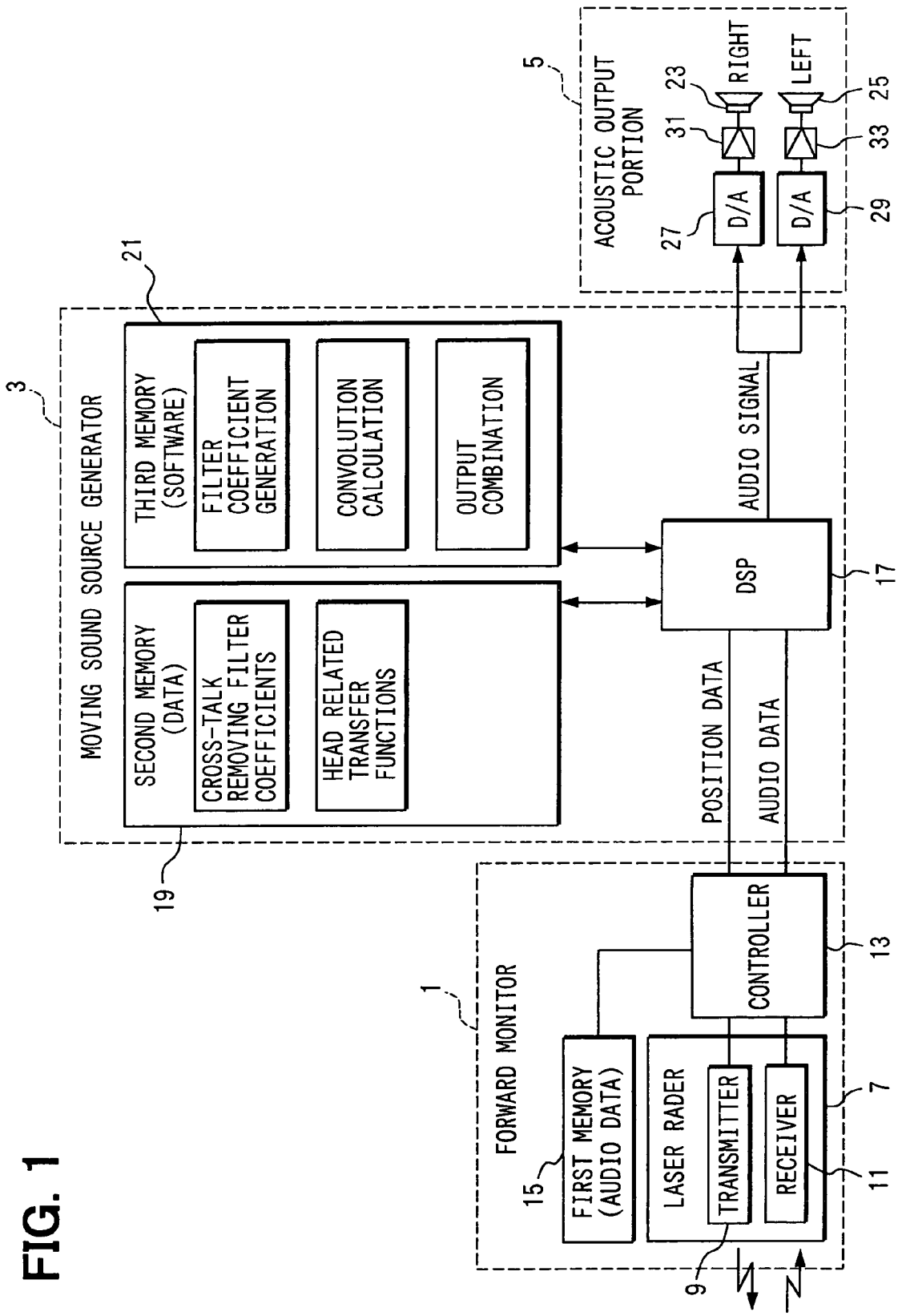
FIG. 1 is a diagram showing a system construction of a vehicle alarm sound outputting device according to a first embodiment.

First, the system construction of a vehicle in which a vehicle alarm sound outputting device of this embodiment is mounted will be described with reference to FIG. 1.

In this embodiment, a system for carrying out alarm sound outputting control to output an alarm sound to passengers mainly comprises a forward monitor 1 for monitoring a forward portion of the vehicle itself, a moving sound source generator 3 for generating a virtual sound source and moving the localization position of the virtual sound source, and an acoustic output portion 5 for outputting an alarm sound by the virtual sound source.

The forward monitor 1 is a device using a laser radar 7. The laser radar 7 is equipped with a transmitter 9 for outputting a laser beam, and a receiver 11 for detecting reflected light of the laser beam, and also is equipped with a controller 13 for controlling the operation of the forward monitor 1. Audio data corresponding to alarm sounds are stored in a first memory 15.

The controller 13 is an electronic controller including a microcomputer as a main part, and it may be formed integrally with the laser radar 7. Furthermore, a CCD camera, a sonar using ultrasonic waves or the like may be used. Furthermore, the audio data may be stored in the moving sound source generator 3 or the like.

The moving sound source generator 3 is equipped with DSP (digital signal processor) 17, a second memory 19 for storing various kinds of data such as filter coefficients, etc., and a third memory 21 for storing software, etc.

In the second memory 19 are stored cross-talk removing filter coefficients and head related transfer functions (HRTF) described later, etc., and in the third memory 21 are stored a program for generating filter coefficients described later, a program for convolution calculation, a program for output synthesis (of the head related transfer functions and the cross-talk removing filter coefficients), etc.

The head related transfer function is a coefficient (for generating a binaural sound source) for determining a localization position when a person hears a sound by his/her right and left ears) as well known, and the cross-talk removing filter coefficient is a filter coefficient for making a person hear one sound source by his/her right or left ear (that is, a coefficient for removing the cross-talk between the speaker and the ear of the person who hears the sound).

The acoustic output portion 5 has a pair of right and left speakers 23 and 25, and also has D/A 27, 29 and amplifiers 31, 33 in connection with the speakers 23, 25, respectively.

Accordingly, in the system thus constructed, position data of an obstacle and audio data (monaural sound source) of an alarm sound are output from the controller 13 of the forward monitor 1 to DSP 17 of the moving sound source generator 3.

In DSP 17, an audio signal which can implement a virtual sound source (in this case, a moving virtual sound source) is created according to each program by using the head related transfer functions and the cross-talk removing filter coefficients, and the audio signal thus created is output to the acoustic output portion 5.

In the acoustic output portion 5, the driving signal corresponding to the audio signal is output to each of the speakers 23, 25 to actuate the speakers 23, 25 so that passengers hear the alarm sound from the localization position of the virtual sound source (in this case, the moving localization position).

Next, the operation of this embodiment will be described in detail together with the principle thereof.

Figure 2A:
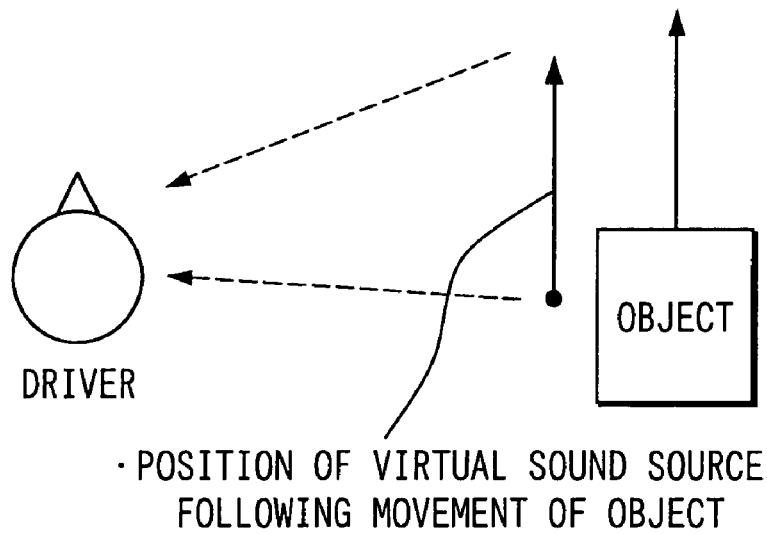
FIG. 2A is a diagram showing a movement of a virtual sound source according to the first embodiment.

According to this embodiment, the position of an obstacle in front of the vehicle (an object such as a vehicle or the like in front of the vehicle concerned) is detected, and as shown in FIG. 2A, the virtual sound source is moved along the moving direction of the object and controlled so that a driver hears an alarm sound from the moving virtual sound source. The details will be described hereunder.

First, a method of generating a basic virtual sound source will be described.

Figure 3:
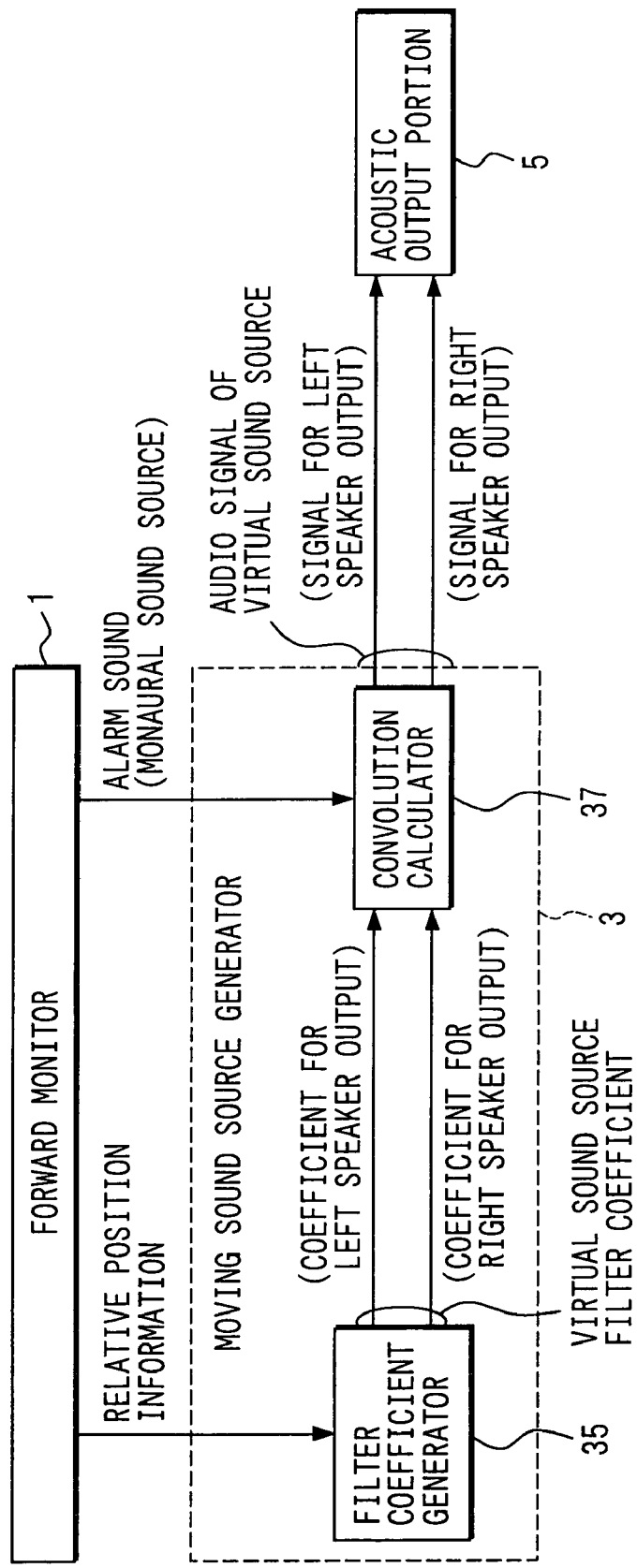
FIG. 3 is a diagram showing the basic construction of the system according to the first embodiment.

As functionally shown in FIG. 3, when obtaining position data of an object (information of the relative position between the vehicle and the object) from the forward monitor 1, a filter coefficient generator 35 of the moving sound source generator 3 generates a filter coefficient (virtual sound source filter coefficient) on the basis of the position data. That is, it generates a left speaker output coefficient and a right speaker output coefficient.

In a convolution calculator 37, the virtual sound source filter coefficient is convoluted into the alarm sound (monaural sound source) achieved from the forward monitor 1 in a time area, thereby carrying out so-called well-known convolution calculation. Another calculation may be used insofar as it can implement the same function. For example, the audio data and the virtual sound source filter coefficient are converted to frequency area data by FFT (Fast Fourier Transform). The two frequency area data thus achieved are subjected to complex multiplication and then subjected to inverse FFT, whereby the same result as the convolution calculation in the time area can be achieved.

Subsequently, the two-channel audio signals achieved from the convolution calculation described above (corresponding to the right and left speakers 23, 25) are reproduced and output from the right and left speakers 23, 25 of the acoustic output portion 5, whereby the virtual sound source is implemented at a desired localization position (in this case, the moving localization position). That is, the virtual sound source is controlled to be generated so that a driver hears an alarm sound as if the alarm sound is emitted from a moving virtual sound source.

The filter coefficient generator 35 and the convolution calculator 37 respectively, functionally represent operating portions for generating the virtual sound source coefficients and carrying out the convolution calculation in the moving sound source generator 3.

Next, the processing of the filter coefficient generator 35 will be described in more detail.

Figure 4:
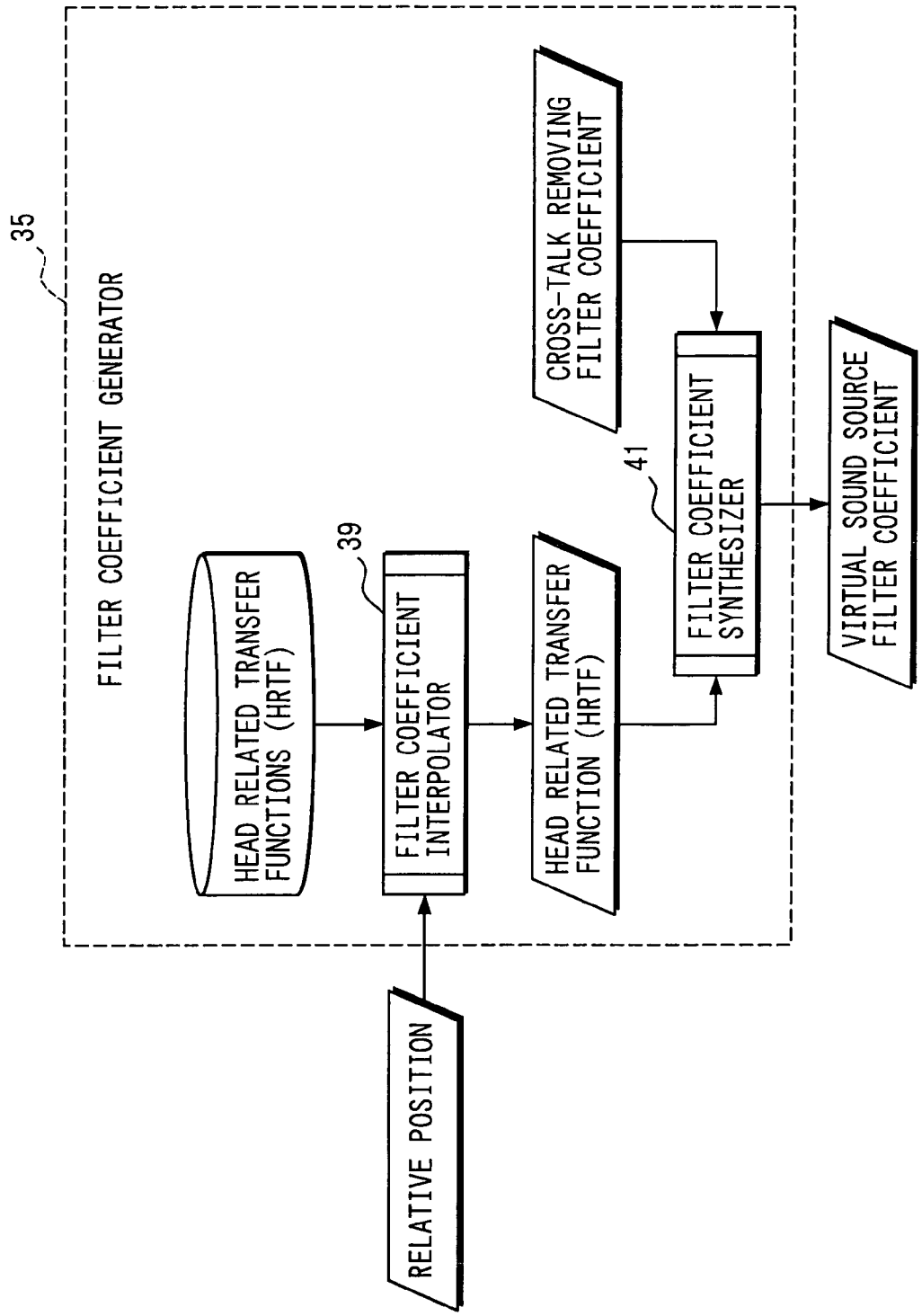
FIG. 4 is a diagram showing the construction of a filter coefficient generating portion of the first embodiment.
Figure 5:
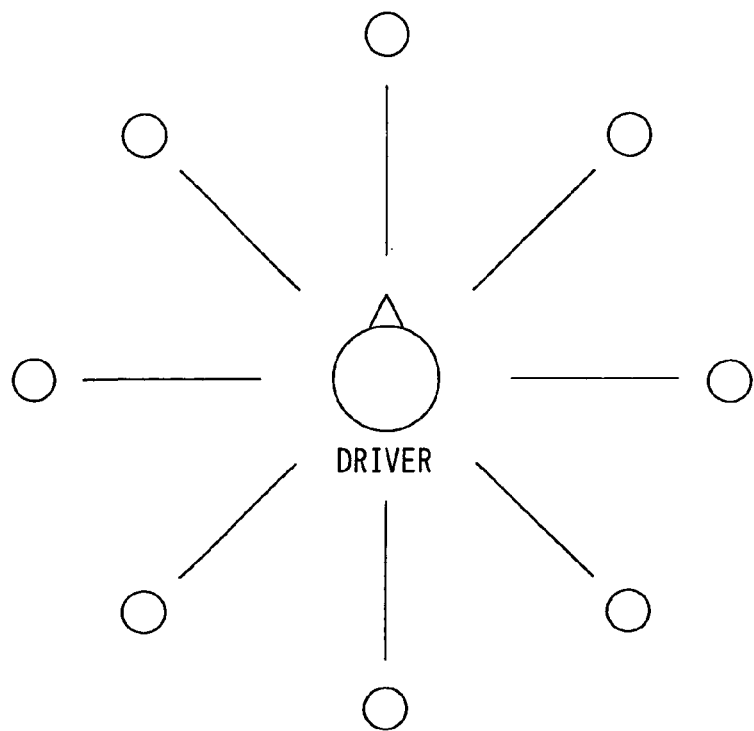
FIG. 5 is a diagram showing eight head related transfer functions serving as the base of the first embodiment.

As shown in FIG. 4, data serving as a base of the head transfer functions are stored in the filter coefficient generator 35. The data concerned correspond to the head related transfer functions when sound sources are located in eight directions around the driver as shown in FIG. 5.

Returning to FIG. 4, in the filter coefficient generator 35, filter coefficients are interpolated in accordance with the relative position between the vehicle and the object by using the head related transfer functions serving as the base in the filter coefficient interpolator 39. Particularly when the object moves, the interpolation of the filter coefficients is carried out while sequentially grasping the relative position of the object so as to follow the movement of the object.

Specifically, it is impossible to hold the head related transfer functions concerning all the localization positions of the space surrounding the driver. Therefore, in this embodiment, the head related transfer function corresponding to the relative position between the vehicle and the object is determined by the interpolation using the eight head related transfer functions as base data.

Figure 6:
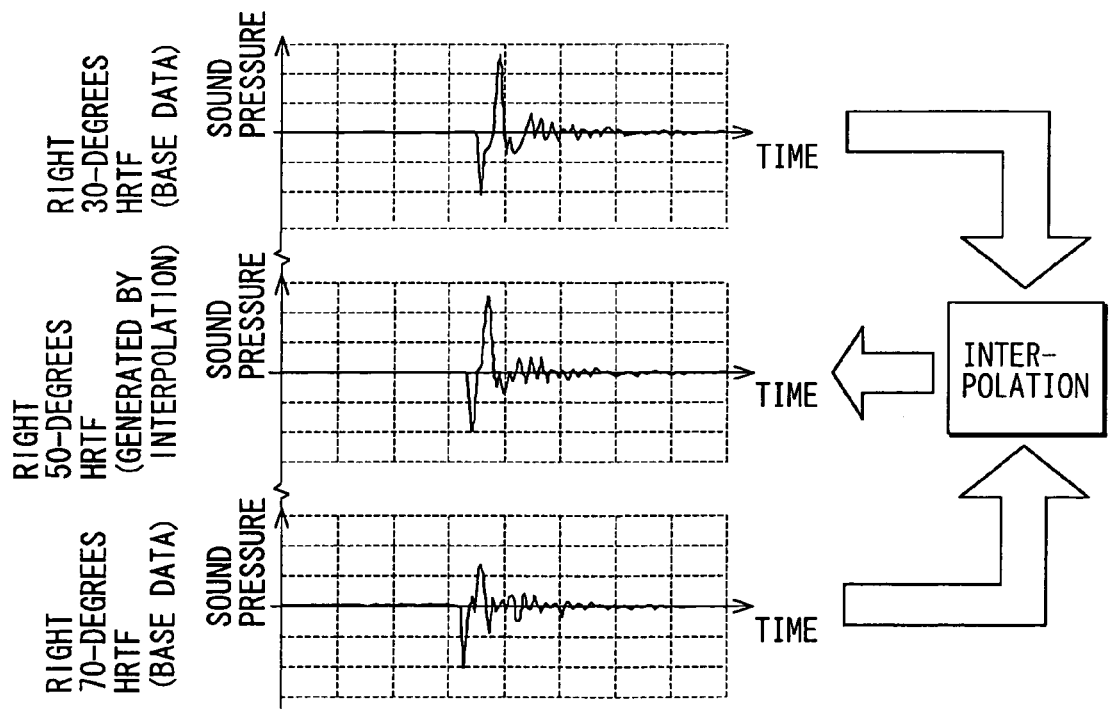
FIG. 6 is a diagram showing an interpolation example of a head related. transfer function of the first embodiment.

For example, when right 30-degrees and right 70-degrees head related transfer functions are provided with respect to the front side of the driver as shown in FIG. 6, in order to generate a right 50-degrees head related transfer function, the interpolation is carried out so that a variation state of sound pressure is located at the intermediate position between the right 30-degrees and the right 70-degrees (for example, so as to be proportionally distributed), thereby generating the head related transfer function.

Returning to FIG. 4, in a filter coefficient synthesizer 41, interpolated head related transfer functions and the cross-talk removing coefficients are combined with each other to generate a virtual sound source filter coefficient.

Figure 7:
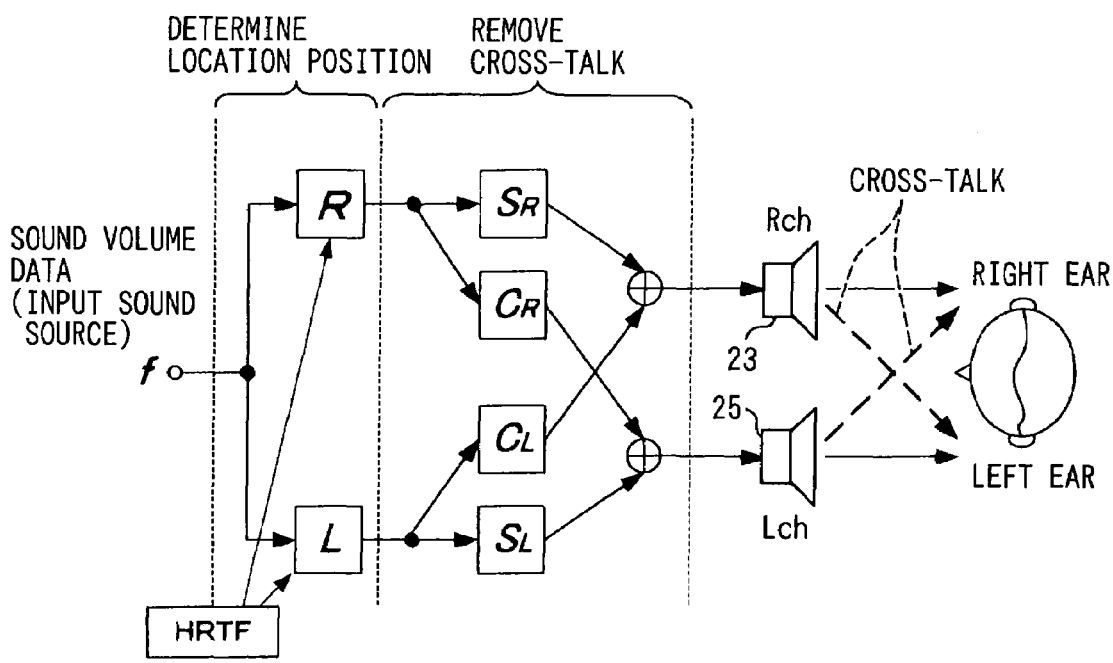
FIG. 7 is a diagram showing a method of combining the head related transfer function of the first embodiment and a cross-talk removing filter coefficient.

That is, as shown in FIG. 7, calculation is carried out on the (interpolated) head related transfer functions for determining a localization position, that is, the head related transfer functions R, L corresponding to the right and left ears and the cross-talk removing filter coefficients $S_R$, $C_R$, $C_L$, $S_L$ to determine virtual sound source filter coefficients ($RXS_R + LXC_L$), ($LXS_L + RXC_R$) and also achieve outputs (audio signals) to the respective speakers 23, 25).

Specifically, on the basis of the calculation of the following equations (1) and (2), the outputs to the right and left speakers 23, 25 are achieved. In the following equations (1), (2), "X" represents the convolution calculation.

$$\text{Right speaker output} = (RXS_R + LXC_L) xf \quad (1)$$

$$\text{Left speaker output} = (LXS_L + RXC_R) xf \quad (2)$$

$S_R$: coefficient for transferring the sound traveling from the right speaker into the right ear $C_R$: coefficient for canceling the sound traveling from the left speaker into the right ear $C_L$ coefficient for canceling the sound from the right speaker into the left ear $S_L$: coefficient for transferring the sound from the left speaker to the left ear f: audio data (input sound source)

That is, the virtual sound source filter coefficients generated in the filter coefficient generator 35 are convoluted with the audio data of the alarm sound in the convolution calculator 37 as shown in FIG. 3 and the equations (1) and (2), and the acoustic signals of the virtual sound sources are generated in connection with the right and left speakers 23, 25.

Accordingly, the right and left speakers 23, 25 are driven on the basis of the acoustic signals to thereby output sounds, so that the driver hears an alarm sound (for example, electronic sound) from the position at which the object exists, that is, along the moving direction of the object when the object moves.

As described above, according to this embodiment, a virtual sound source can be disposed at the position corresponding to the position of the object by interpolating the head related transfer function, and thus when the object moves, the virtual sound source can be moved while following the movement of the object as shown in FIG. 2A.

That is, the virtual sound source is not disposed at a fixed position, but it can be moved while following the movement of the object, so that the driver can instantaneously and clearly recognize the position of the object.

The direction from the driver to the object, and thus the direction from the driver to the virtual sound source is an attention-paying direction along which the driver's attention is paid, and if this attention-paying direction is roughly met, it may be somewhat displaced. Furthermore, the distance between the driver and the virtual sound source may be somewhat displaced from the actual distance between the driver and the object if the direction thereof is roughly along the attention-paying direction.

Second Embodiment

Next, a second embodiment will be described. The description of the same contents as those of the first embodiment is omitted.

The system construction of the vehicle in which the vehicle alarm sound outputting device of this embodiment is mounted is basically the same as that of the first embodiment, and this embodiment is greatly different from the second embodiment mainly in the filter coefficient generator. Therefore, the filter coefficient generator of this embodiment will be described.

Figure 8:
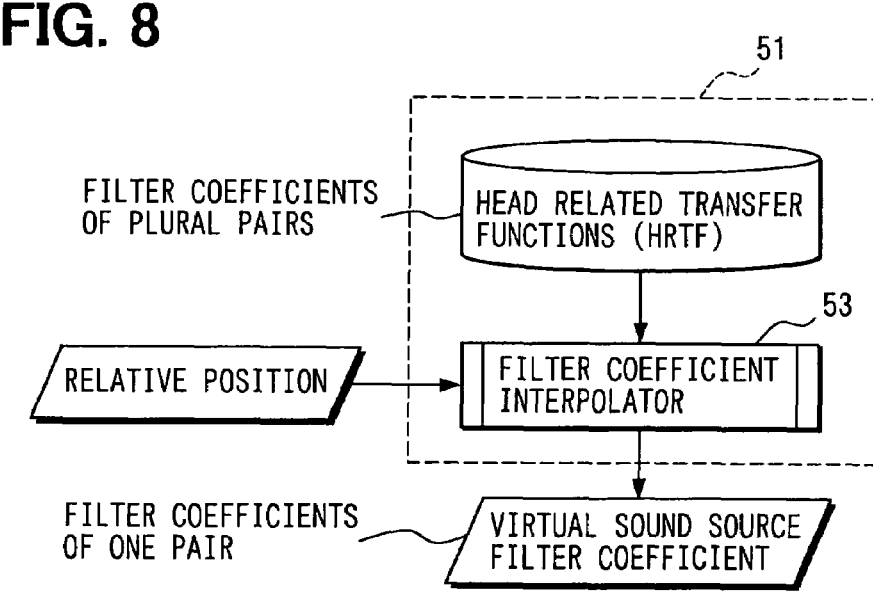
FIG. 8 is a diagram showing the construction of a filter coefficient generator of a vehicle alarm sound outputting device according to a second embodiment.

As shown in FIG. 8, plural pairs of virtual sound source filter coefficients are stored in the filter coefficient generator 51 of this embodiment.

That is, for example, the virtual sound source filter coefficients corresponding to the localization positions of virtual sound sources at eight places are stored as shown in FIG. 5. The virtual sound source filter coefficients are achieved by subjecting the head related transfer functions corresponding to the eight localization positions and the cross-talk removing filter coefficients to calculation.

As in the case of the first embodiment, in the filter coefficient interpolator 53, a virtual sound source filter coefficient is interpolated in connection with a localization position of the object, and a pair of virtual sound source filter coefficients are achieved in connection with the localization position of the interpolation concerned. That is, the virtual sound source filter coefficients corresponding to the right and left speakers are achieved.

Subsequently, the audio data are convoluted with the virtual sound source filter coefficients and audio signals for the right and left speakers are generated.

This embodiment has the same effect as the first embodiment.

Third Embodiment

Next, a third embodiment will be described, and the description of the same content as that of the first embodiment is omitted.

The system construction of the vehicle in which the vehicle alarm sound outputting device of this embodiment is basically the same as that of the first embodiment, and it is greatly different from that of the first embodiment mainly in the filter coefficient generator. Therefore, the filter coefficient generator will be mainly described.

Figure 9:
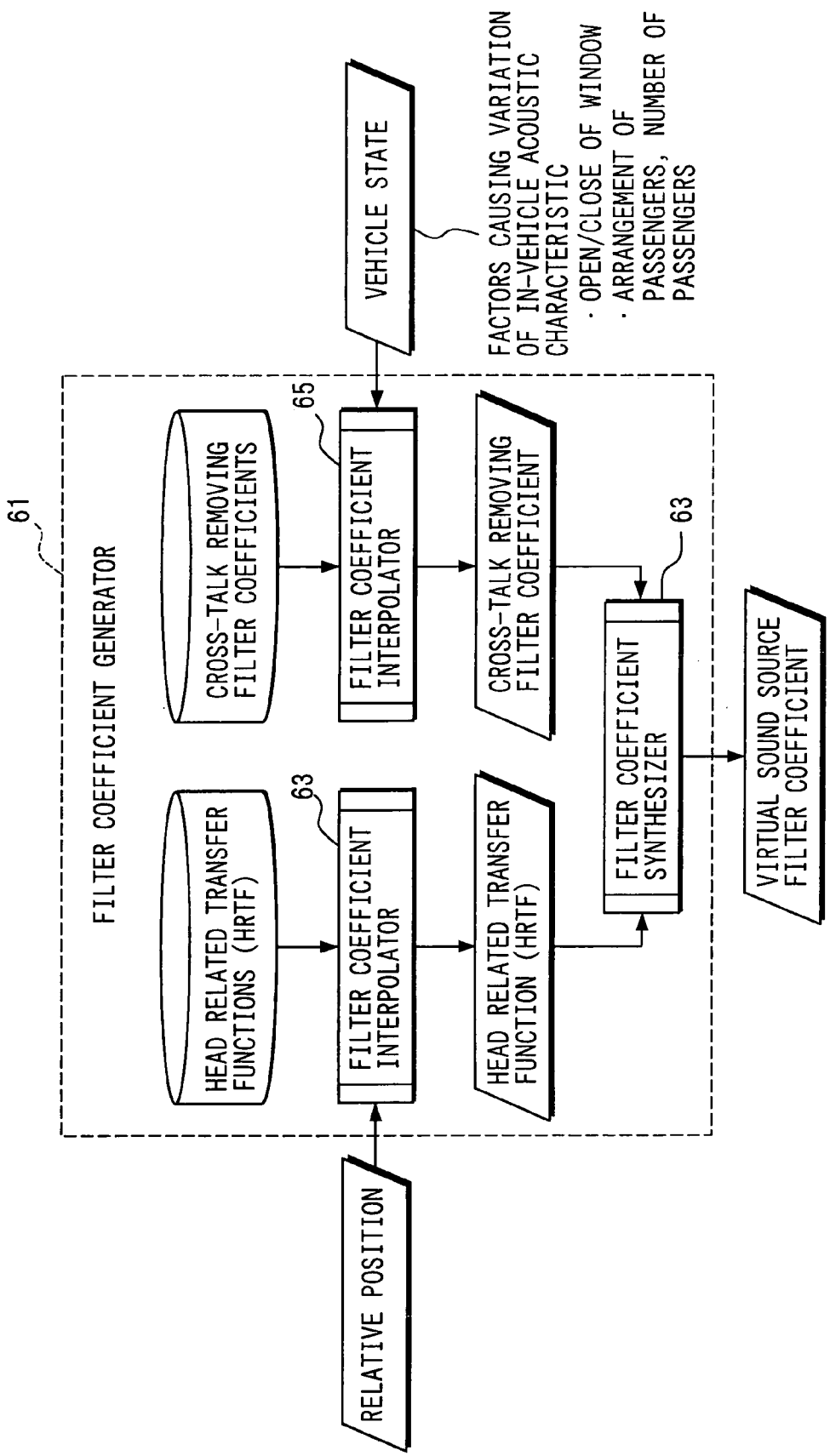
FIG. 9 is a diagram showing the construction of a filter coefficient generator of a vehicle alarm sound outputting device according to a third embodiment.

As shown in FIG. 9, in the filter coefficient generator 61 of this embodiment, the head related transfer functions corresponding to the localization positions of virtual sound sources at eight places which serve as base data are interpolated in accordance with the relative position of the object in a filter coefficient interpolator 63, thereby calculating (interpolated) head related transfer functions.

In the filter coefficient interpolator 65, the cross-talk removing filter coefficients which are fixed values are interpolated in accordance with the vehicle state to achieve (interpolated) cross-talk removing filter coefficients.

That is, the acoustic characteristic in the vehicle room is varied in accordance with the opening/closing state of windows, the arrangement of passengers and the number of passengers. Therefore, the opening/closing state of windows, the arrangement of passengers and the number of passengers are detected by switches, sensors, etc., and the cross-talk removing filter coefficients are interpolated in accordance with the detection result.

As an interpolating method, for example, cross-talk removing filter coefficients are achieved in connection with the opening/closing state of windows, the arrangement of passengers and the number of passengers in advance by experiments or the like, and the optimum cross-talk removing filter coefficients are selected in accordance with the detection result.

In the filter coefficient synthesizer 63, the interpolated head related transfer and the interpolated cross-talk removing filter coefficients are combined to generate a virtual sound source filter coefficient.

This embodiment has the same effect as the first embodiment, and particularly the cross-talk removing filter coefficients are interpolated in accordance with the vehicle state, so that passengers can accurately hear an alarm sound based on a virtual sound source from an intended position.

Fourth Embodiment

Next, a fourth embodiment will be described, and the description of the same content as that of the first embodiment is omitted.

Figure 10:
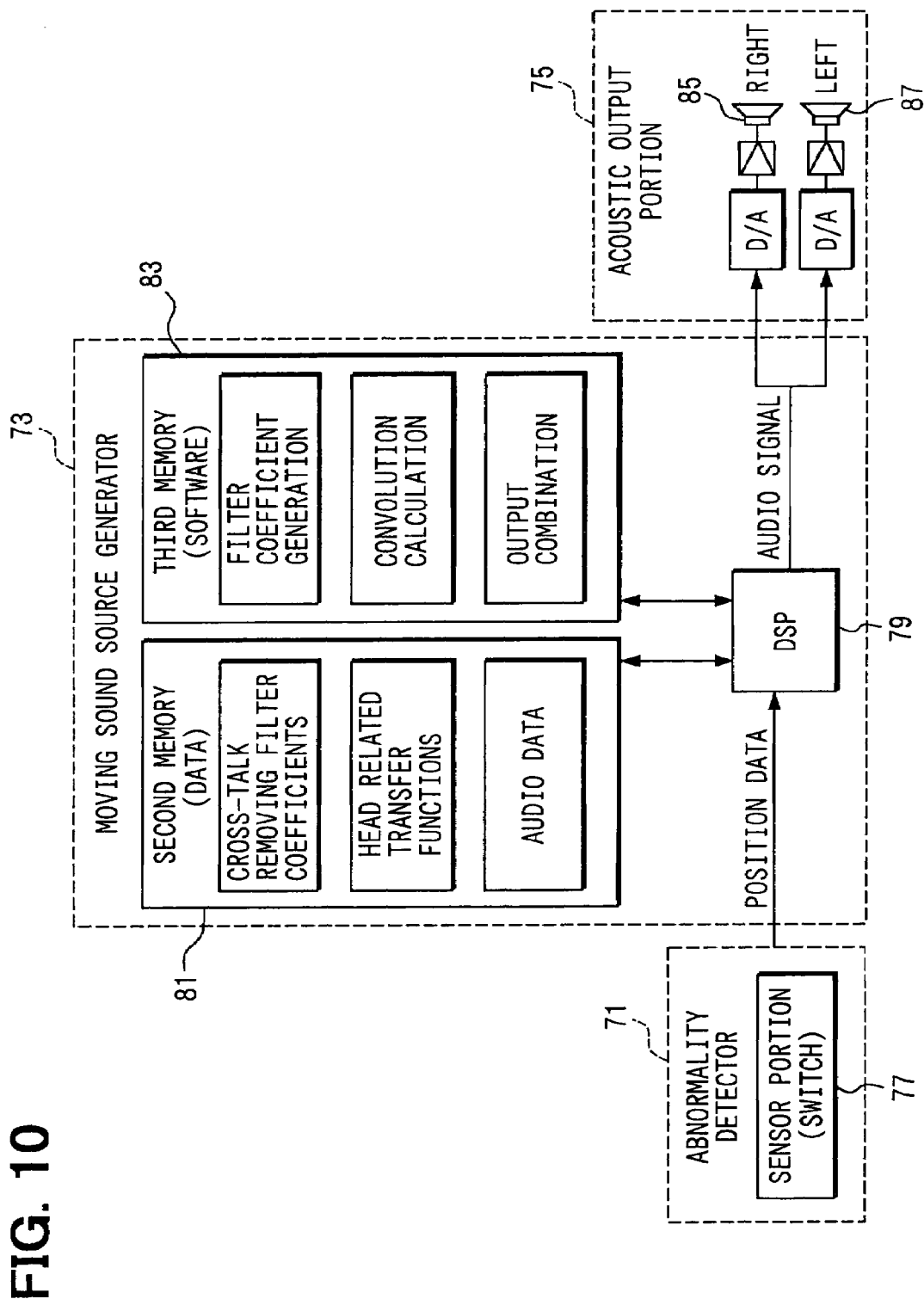
FIG. 10 is a diagram showing the system construction of a vehicle alarm sound outputting device according to a fourth embodiment.

FIG. 10 shows the system construction of a vehicle in which a vehicle alarm sound outputting device of this embodiment is mounted.

As shown in FIG. 10, this embodiment is equipped with an abnormality detector 71 for detecting a detection target object or abnormality of the state of the object concerned, a moving sound source generator 73 for moving the localization position of a virtual sound source, and an acoustic output portion 75 for outputting an alarm sound based on the virtual sound source.

The abnormality detector 71 is equipped with a sensor portion 77 for detecting abnormality such as an incompletely closed door, for example, and it transmits to DSP 79 of the moving sound source generator 73 position data indicating the position at which the abnormality of the incompletely closed door (during running of the vehicle) occurs.

As in the case of the first embodiment, the moving sound source generator 73 generates an audio signal of a virtual sound source whose localization position corresponds to the position of the incompletely closed door according to the programs of filter coefficient generation, convolution calculation, output combination, etc. stored in a third memory 83 by using cross-talk removing filter coefficients, head related transfer functions, audio data (such as electronic sounds, etc.) stored in a second memory 81.

Figure 2B:
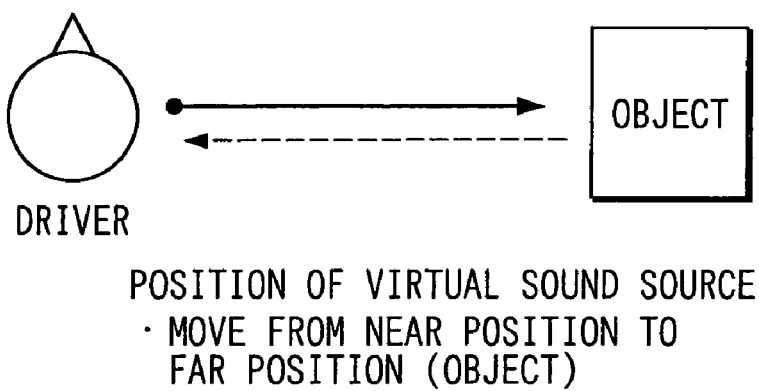
FIG. 2B is a diagram showing a movement of a virtual sound source according to a fourth embodiment.

Particularly, in this embodiment, the audio signal is generated so that the localization position is not set to one point of the position of the incompletely closed door, but the localization position of the virtual sound source is moved along the attention-paying direction connecting the driver and the incompletely closed door as shown in FIG. 2B.

Specifically, the localization position of the virtual sound source is moved so that the virtual sound source is far away from the driver to the position of the incompletely closed door.

Accordingly, at the acoustic output portion receiving this audio signal, the right and left speakers 85 and 87 are driven on the basis of the audio signal, so that the driver hears the alarm sound so that the alarm sound is far away from the driver himself/herself in the direction to the incompletely closed door.

Therefore, the same effect as that of the first embodiment can be achieved, and also the driver can more clearly grasp the direction in which he/she should pay his/her attention. When the virtual sound source is moved along the attention-paying direction, a considerable effect can be achieved by moving the virtual sound source so that not only the virtual sound source is far away from the driver, but also the virtual sound source approaches to the driver.

Next, another application example will be described.

Figure 2C:
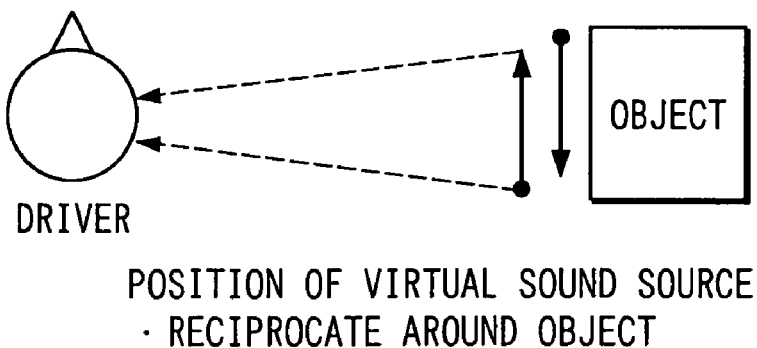
FIG. 2C is a diagram showing a movement of the virtual sound source.

In this embodiment, the localization position of the virtual sound source is moved (for example, reciprocatively moved) so that the virtual sound source is not moved along the attention-paying direction as in the case of the above embodiment, but the virtual sound source is moved in the front-and-rear direction, in the right-and-left direction, in the up-and-down direction, etc. when viewed from the driver's side as shown in FIG. 2C.

That is, the attention-paying direction facing some direction may be controlled so as to be moved in a range spreading in a cone shape (for example, bell-shape) when viewed from the driver's side, which can also effectively attract driver's attention.

Fifth Embodiment

Next, a fifth embodiment of the present invention will be described, and the description of the same content as that of the first embodiment is omitted.

Figure 11:
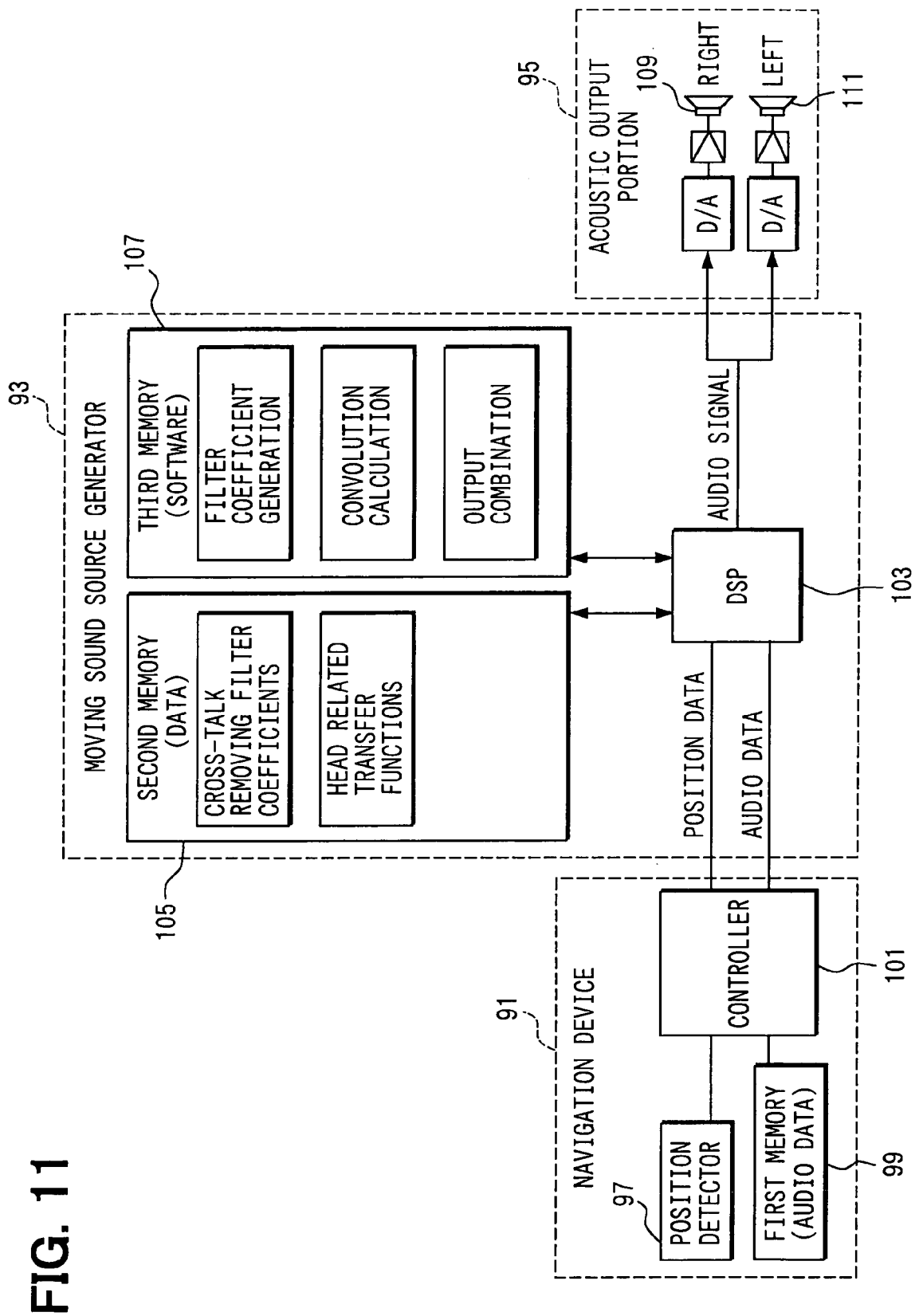
FIG. 11 is a diagram showing the system construction of a vehicle alarm sound outputting device according to a fifth embodiment.

FIG. 11 shows the system construction of a vehicle in which a vehicle alarm sound outputting device of this embodiment is mounted.

As shown in FIG. 11, this embodiment is equipped with a navigation device 91, a moving sound source generator 93 for moving the localization position of the virtual sound source, and an acoustic output portion 95 for outputting an alarm sound based on the virtual sound source.

The navigation device 91 has a position detector 97 which stores map data and also detects the position of the vehicle itself, a first memory 99 for storing audio data of alarm sounds, etc., and a controller 101 for controlling the above elements.

Position data indicating the positions of target objects needed for guidance, etc. and audio data are transmitted from the navigation device 91 to DSP 103 of the moving sound source generator 93.

As in the case of the first embodiment, the moving sound source generator 93 generates an audio signal of a virtual sound source with the position of a target object set as a localization position according to programs of filter coefficient generation, convolution calculation, output synthesis, etc. stored in a third memory 107 by using cross-talk removing filter coefficients and head related transfer functions stored in a second memory 105.

For example, when a right sharp curve exists ahead of the vehicle on the road and this fact is guided to the driver (passengers) with voice or the like, a voice guidance "right sharp curve ahead" is output and also an audio signal is generated so that an electronic sound or the like sounds along the curve.

Accordingly, in the acoustic output portion receiving this audio signal, the right and left speakers 109 and 111 are driven on the basis of the audio signal, and the driver hears the alarm sound thereof as if the alarm sound moves along the road ahead. Therefore, the driver can properly carry out the driving.

Furthermore, a target place point guided in the navigation device or a mark at some midpoint of a route may be set to a localization position of a virtual sound source, and the localization position may reciprocate or be moved along the attention-paying direction in order to arouse the attention.

Accordingly, as shown in, for example, FIG. 9 (the third embodiment) the method can be adapted to the acoustic characteristic inherent to the vehicle room which is varied according to the open/close state of windows and the arrangement of passengers.

Furthermore, even when the relative position between the driver and the object being detected is not varied, intentional movement of the localization position of the virtual sound source attracts driver's attention and makes the driver easily perceive the object.

Still furthermore, the driver's attention can be attracted, not to one point, but to a fixed range. At this time, if the moving range of the localization position is set to be coincident with the size of the object, the driver can immediately perceive not only the position of the object, but also the size thereof.

Furthermore, it is estimated that some displacement occurs between a desired localization position and an actual localization position due to the difference in acoustic characteristic among individuals or an environmental variation in the vehicle room. Therefore, if the driver's attention is attracted to one point, it would be considered such a situation that no object exists at that position and it is delayed to (visually) perceive the object.

Therefore, an object to which attention is made to be attracted is absolutely contained in the moving range of the virtual sound source by moving the virtual sound source in a fixed range, and thus the driver can quickly perceive the object.

The present invention is not limited to the above embodiments, and various modifications may be made without departing from the subject matter of the present invention.

(1) For example, on the basis of information achieved through the communication between a road and a vehicle or between vehicles, for example, information on the position of an emergency vehicle or the travel direction thereof, the position of the emergency vehicle is set as the localization position of the virtual sound source, and the localization position is moved along the moving direction of the emergency vehicle or the like.

(2) Furthermore, a well-known stereo dipole system (see JP-T-2000-506691) may be used as a method of generating the virtual sound source.

(3) Still furthermore, when an object around the vehicle concerned is detected by a laser radar or the like, the relative position between the object and the vehicle concerned may be informed. For example, when the object is near to the vehicle concerned, the relative position between the vehicle concerned and the object may be informed by increasing the volume of an electronic sound or narrowing the interval of the sounding of the electronic sound or the like.

What is claimed is:

1. A vehicle alarm sound outputting device for outputting an alarm sound by driving an alarm sound outputting unit on the basis of information from a condition detecting unit for detecting the condition of a vehicle or the condition of the surrounding of the vehicle, comprising:

a position setting unit for detecting a localization position of a virtual sound source of the alarm sound in accordance with a detection result of the condition detecting unit;

an alarm controlling unit for controlling the alarm sound outputting unit so that an occupant of the vehicle hears the alarm sound from the virtual sound source;

a filter coefficient generating unit for generating virtual sound source filter coefficients in accordance with the localization position of the virtual sound source;

a convolution calculator for conducting convolution calculation on audio data of the alarm sound and filter coefficients of the virtual sound source and outputting a virtual sound source audio signal; and a virtual sound source outputting unit for reproducing and outputting the virtual sound source audio signal from the alarm sound outputting unit, wherein the localization position of the virtual sound source is controlled to move so that the occupant hears the alarm sound as if the alarm sound moves, wherein the localization position of the virtual sound source is moved so that the attention-paying direction from the occupant to the virtual sound source is varied within a predetermined range when viewed from the occupant, wherein the filter coefficient generator combines head related transfer functions and cross-talk removing filter coefficients to achieve the virtual sound source filter coefficients.

2. The vehicle alarm sound outputting device according to claim 1, wherein the localization position of the virtual sound source is moved along an attention-paying direction from the occupant to the virtual sound source.

3. The vehicle alarm sound outputting device according to claim 2, wherein the localization position of the virtual sound source is moved so as to be far away from the occupant.

4. The vehicle alarm sound outputting device according to claim 1, wherein the localization position of the virtual sound source is moved so that the attention-paying direction reciprocates in a horizontal direction, a vertical direction or an oblique direction.

5. The vehicle alarm sound outputting device according to claim 1, wherein the condition detecting unit is a unit for detecting the condition of the vehicle interlockingly with a car navigation device.

6. The vehicle alarm sound outputting device according to claim 1, wherein the condition detecting unit is a unit for achieving position information of an emergency vehicle out of the vehicle concerned.

7. A program for making a computer implementing the function of the vehicle alarm sound outputting device according to claim 1.

8. A vehicle alarm sound outputting device for outputting an alarm sound by driving an alarm sound outputting unit on the basis of information from a condition detecting unit for detecting the condition of a vehicle or the condition of the surrounding of the vehicle, comprising:
a position setting unit for detecting a localization position of a virtual sound source of the alarm sound in accordance with a detection result of the condition detecting unit;
an alarm controlling unit for controlling the alarm sound outputting unit so that an occupant of the vehicle hears the alarm sound from the virtual sound source,
a filter coefficient generating unit for generating virtual sound source filter coefficients in accordance with the localization position of the virtual sound source;
a convolution calculator for conducting convolution calculation on audio data of the alarm sound and filter coefficients of the virtual sound source and outputting a virtual sound source audio signal; and
a virtual sound source outputting unit for reproducing and outputting the virtual sound source audio signal from the alarm sound outputting unit,
wherein the localization position of the virtual sound source is controlled to move so that the occupant hears the alarm sound as if the alarm sound moves, wherein the localization position of the virtual sound source is moved so that the attention-paving direction from the occupant to the virtual sound source is varied within a predetermined range when viewed from the occupant,
wherein the filter coefficient generator carries out interpolation on prescribed virtual sound source filter coefficients to achieve a virtual sound source filter coefficient corresponding to the localization position of a target virtual sound source,
wherein the filter coefficient generator combines head related transfer functions and cross-talk removing filter coefficients to achieve the virtual sound source filter coefficients.

9. The vehicle alarm sound outputting device according to claim 8, wherein the localization position of the virtual sound source is moved so that the attention-paying direction reciprocates in a horizontal direction, a vertical direction or an oblique direction.

10. The vehicle alarm sound outputting device according to claim 8, wherein the condition detecting unit is a unit for detecting the condition of the vehicle interlockingly with a car navigation device.

11. The vehicle alarm sound outputting device according to claim 8, wherein the condition detecting unit is a unit for achieving position information of an emergency vehicle out of the vehicle concerned.

12. A vehicle alarm sound outputting device for outputting an alarm sound by driving an alarm sound outputting unit on the basis of information from a condition detecting unit for detecting the condition of a vehicle or the condition of the surrounding of the vehicle, comprising:
a position setting unit for detecting a localization position of a virtual sound source of the alarm sound in accordance with a detection result of the condition detecting unit;
an alarm controlling unit for controlling the alarm sound outputting unit so that an occupant of the vehicle hears the alarm sound from the virtual sound source, wherein the localization position of the virtual sound source is controlled to move so that the occupant hears the alarm sound as if the alarm sound moves;
a filter coefficient generating unit for generating virtual sound source filter coefficients in accordance with a localization position of the virtual sound source;
a convolution calculator for conducting convolution calculation on audio data of the alarm sound and filter coefficients of the virtual sound source and outputting a virtual sound source audio signal; and
a virtual sound source outputting unit for reproducing and outputting the virtual sound source audio signal from the alarm sound outputting unit,
wherein the filter coefficient generator combines head related transfer functions and cross-talk removing filter coefficients to achieve the virtual sound source filter coefficients.

13. The vehicle alarm sound outputting device according to claim 12, wherein the filter coefficient generator carries out interpolation on cross-talk removing filter coefficients to achieve the virtual sound source filter coefficients.

14. A program for making a computer implementing the function of the vehicle alarm sound outputting device according to claim 8.

15. The vehicle alarm sound outputting device according to claim 8, wherein the localization position of the virtual sound source is moved along an attention-paying direction from the occupant to the virtual sound source.

16. The vehicle alarm sound outputting device according to claim 15, wherein the localization position of the virtual sound source is moved so as to be far away from the occupant.

* * * * *